US011887527B2

(12) United States Patent
Xu et al.

(10) Patent No.: US 11,887,527 B2
(45) Date of Patent: Jan. 30, 2024

(54) SPECIAL-SHAPED DISPLAY PANEL AND DISPLAY DEVICE WITH GATE LINES CUTTING OFF IN NON-DISPLAY SUB-AREA

(71) Applicant: BOE Technology Group Co., Ltd., Beijing (CN)

(72) Inventors: Pan Xu, Beijing (CN); Yicheng Lin, Beijing (CN); Guoying Wang, Beijing (CN); Xing Zhang, Beijing (CN); Ying Han, Beijing (CN); Zhan Gao, Beijing (CN); Dacheng Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/921,585

(22) PCT Filed: May 12, 2021

(86) PCT No.: PCT/CN2021/093378
§ 371 (c)(1),
(2) Date: Oct. 26, 2022

(87) PCT Pub. No.: WO2021/258890
PCT Pub. Date: Dec. 30, 2021

(65) Prior Publication Data

US 2023/0169908 A1 Jun. 1, 2023

(30) Foreign Application Priority Data

Jun. 22, 2020 (CN) ......................... 202010575627.5

(51) Int. Cl.
*G09G 3/20* (2006.01)
*G09F 9/30* (2006.01)

(52) U.S. Cl.
CPC ............. *G09G 3/2092* (2013.01); *G09F 9/30* (2013.01); *G09G 3/20* (2013.01);
(Continued)

(58) Field of Classification Search
CPC ......... G09G 3/2092; G09G 2300/0439; G09G 2310/0267; G09G 3/20; G09G 2300/0426; G09G 2320/0223; G09F 9/30
See application file for complete search history.

(56) References Cited

U.S. PATENT DOCUMENTS

2008/0129717 A1* 6/2008 Lee ...................... G09G 3/3611 345/204
2010/0013853 A1* 1/2010 Takatori .................. G09G 3/20 345/611
(Continued)

FOREIGN PATENT DOCUMENTS

CN 102789755 A 11/2012
CN 105788462 A 7/2016
(Continued)

OTHER PUBLICATIONS

CN202010575627.5 first office action, dated Aug. 2, 2021.
PCT/CN2021/093378 international search report, dated Jul. 26, 2021.

*Primary Examiner* — Adam J Snyder
(74) *Attorney, Agent, or Firm* — IPro, PLLC

(57) ABSTRACT

A special-shaped display panel includes: a special-shaped display area (S) having gate lines (G), some of the gate lines (G) being cut off in a non-display sub-area (S2) of the special-shaped display area (S); a first gate drive circuit set (A1) located on one side of the special-shaped display area (S), electrically connected to one ends of gate lines (G) which are not cut off by the non-display sub-area (S2), and electrically connected to gate lines (G) on one side which are cut off by the non-display sub-area (S2); and a second gate drive circuit set (A2) located on the other side of the special-shaped display area (S), electrically connected to the other ends of gate lines (G) which are not cut off by the non-display sub-area (S2), and electrically connected gate
(Continued)

lines (G) on the other side which are cut off by the non-display sub-area (S2).

15 Claims, 8 Drawing Sheets

(52) U.S. Cl.
CPC ............... *G09G 2300/0426* (2013.01); *G09G 2300/0439* (2013.01); *G09G 2310/0267* (2013.01); *G09G 2320/0223* (2013.01)

(56) References Cited

U.S. PATENT DOCUMENTS

| | | | | |
|---|---|---|---|---|
| 2016/0019856 | A1* | 1/2016 | Tanaka | G09G 3/3666 345/206 |
| 2017/0116923 | A1* | 4/2017 | Bae | G09G 3/3266 |
| 2017/0249906 | A1* | 8/2017 | Noh | G09G 3/3275 |
| 2018/0190190 | A1 | 7/2018 | Xi et al. | |
| 2018/0240377 | A1* | 8/2018 | Xu | G09G 3/3611 |
| 2019/0333433 | A1* | 10/2019 | Zhu | G09G 3/20 |
| 2019/0362678 | A1 | 11/2019 | Shin et al. | |
| 2020/0089281 | A1 | 3/2020 | Ma et al. | |
| 2021/0225233 | A1 | 7/2021 | Long et al. | |
| 2022/0190056 | A1 | 6/2022 | Guo et al. | |

FOREIGN PATENT DOCUMENTS

| | | | |
|---|---|---|---|
| CN | 107104113 | A | 8/2017 |
| CN | 107633807 | A | 1/2018 |
| CN | 107749247 | A | 3/2018 |
| CN | 108010949 | A | 5/2018 |
| CN | 108257544 | A | 7/2018 |
| CN | 108877624 | A | 11/2018 |
| CN | 208077535 | U | 11/2018 |
| CN | 109118966 | A | 1/2019 |
| CN | 110364109 | A | 10/2019 |
| CN | 209674779 | U | 11/2019 |
| CN | 111613145 | A | 9/2020 |
| JP | 2006234918 | A | 9/2006 |

* cited by examiner

SPECIAL-SHAPED DISPLAY PANEL AND DISPLAY DEVICE WITH GATE LINES CUTTING OFF IN NON-DISPLAY SUB-AREA

CROSS REFERENCE TO RELATED APPLICATIONS

The present application is a national phase entry under 35 U.S.C. § 371 of International Application No. PCT/CN2021/093378, filed on May 12, 2021, which claims priority of Chinese Patent Application No. 202010575627.5, filed with the China National Intellectual Property Administration on Jun. 22, 2020 and entitled "SPECIAL-SHAPED DISPLAY PANEL AND DISPLAY DEVICE", the entire contents of which are incorporated herein by reference.

FIELD

The present disclosure relates to the technical field of display, and in particular to a special-shaped display panel and a display device.

BACKGROUND

As the technology of the display industry grows increasingly mature, special-shaped display gradually appears in public view. With an increasing number of demands for exotic display devices, design for special-shaped display is much different from past. Conventional square screens or simple special-shaped screens are generally symmetrical, for example, a circular watch, a mobile phone with a notch on the screen, etc., and the current market for asymmetric hollow-out special-shaped display is vacant yet. The asymmetric hollow-out special-shaped display panel generally receives signals differently on the two asymmetric sides, resulting in image dislocation.

SUMMARY

Embodiments of the present disclosure provide a special-shaped display panel. The special-shaped display panel includes:

a special-shaped display area including a non-display sub-area and a display sub-area surrounding the non-display sub-area, the special-shaped display area being provided with a plurality of gate lines extending in a first direction, some of the gate lines being cut off in the non-display sub-area, and the display sub-area being asymmetric with respect to a straight line which passes through a center of the special-shaped display area and is perpendicular to the first direction;

a first gate drive circuit set located on one side of the special-shaped display area, electrically connected to one ends of gate lines which are not cut off by the non-display sub-area, and electrically connected to gate lines on one side which are cut off by the non-display sub-area; and a second gate drive circuit set located on the other side of the special-shaped display area, electrically connected to the other ends of the gate lines which are not cut off by the non-display sub-area, and electrically connected to the gate lines on the other side which are cut off by the non-display sub-area.

In a possible implementation, the display sub-area includes: a first rectangular display sub-area located on one side of the non-display sub-area, a second arc-shaped display sub-area located on the other side of the non-display sub-area, and a third display sub-area connected to one end of the first display sub-area and one end of the second display sub-area, and a fourth display sub-area connected to the other end of the first display sub-area and the other end of the second display sub-area.

The gate line in the first display sub-area is electrically connected to the first gate drive circuit set merely. The gate line in the second display sub-area is electrically connected to the second gate drive circuit set merely. One end of the gate line in the third display sub-area is electrically connected to the first gate drive circuit set, and the other end of the gate line in the third display sub-area is electrically connected to the second gate drive circuit set. One end of the gate line in the fourth display sub-area is electrically connected to the first gate drive circuit set, and the other end of the gate line in the fourth display sub-area is electrically connected to the second gate drive circuit set.

In a possible implementation, a length of the first display sub-area perpendicular to the first direction is equal to a maximum length of the non-display sub-area perpendicular to the first direction. The length of the first display sub-area perpendicular to the first direction is equal to a maximum length of the second display sub-area perpendicular to the first direction.

In a possible implementation, the gate line in the first display sub-area has the same length as the gate line in the second display sub-area in the first direction.

In a possible implementation, the first display sub-area is provided with a plurality of first pixels distributed in an array, and the second display sub-area is provided with a plurality of second pixels distributed in an array.

The first pixels in the first display sub-area arranged in sequence in the first direction have the same column count as the second pixels in the second display sub-area arranged in sequence in the first direction.

In a possible implementation, an outer contour of one side, away from the non-display sub-area, of the third display sub-area is arc-shaped, and an outer contour of one side, away from the non-display sub-area, of the fourth display sub-area is arc-shaped.

The first gate drive circuit set is arranged around the third display sub-area at a periphery of the third display sub-area; and the second gate drive circuit set is arranged around the fourth display sub-area at a periphery of the fourth display sub-area.

In a possible implementation, the first gate drive circuit set includes a plurality of first gate drive circuits which are cascaded mutually; the second gate drive circuit set includes a plurality of second gate drive circuits which are cascaded mutually.

A first-type floating gate drive circuit is arranged between two adjacent second gate drive circuits in at least part of adjacent second gate drive circuits at the periphery of the third display sub-area; a second-type floating gate drive circuit is arranged between two adjacent second gate drive circuits in at least part of adjacent second gate drive circuits at the periphery of the fourth display sub-area.

The two adjacent second gate drive circuits at the periphery of the third display sub-area are electrically connected to each other by means of a signal line skipping the first-type floating gate drive circuit; and the two adjacent second gate drive circuits at the periphery of the fourth display sub-area are electrically connected to each other by means of a signal line skipping the second-type floating gate drive circuit.

In a possible implementation, the special-shaped display panel further includes: a first pulse signal line located at a periphery of the first display sub-area and having a body extension direction perpendicular to the first direction, and an arc-shaped second pulse signal line located at a periphery of the second display sub-area and surrounding an arc-shaped outer contour of the display sub-area.

The first pulse signal line includes a serpentine wire portion and a linear wire portion electrically connected to the serpentine wire portion, a total length of the serpentine wire portion and the linear wire portion being equal to a length of the second pulse signal line.

In a possible implementation, the special-shaped display panel further includes a control integrated circuit (IC).

The linear wire portion is electrically connected to the control IC by means of the serpentine wire portion.

In a possible implementation, the first pulse signal line includes a plurality of serpentine wire portions, the plurality of serpentine wire portions being distributed on the first pulse signal line in sequence at equal intervals.

In a possible implementation, the first pulse signal line and the second pulse signal line are start-of-frame signal lines; and alternatively, the first pulse signal line and the second pulse signal line are clock signal lines.

In a possible implementation, the first pulse signal line has the same line width as the second pulse signal line.

In a possible implementation, the display panel further includes a plurality of first-type signal wires intersecting with the first pulse signal line in an insulated mode, and a plurality of second-type signal wires intersecting with the second pulse signal line in an insulated mode.

An overlapping area of the first pulse signal line and the first-type signal wires is equal to that of the second pulse signal line and the second-type signal wires.

In a possible implementation, the first pulse signal line perpendicularly intersects with the first-type signal wires; and the second pulse signal line perpendicularly intersects with the second-type signal wires.

In a possible implementation, the first-type signal wires are signal wires in the first gate drive circuit set; and the second-type signal wires are signal wires in the second gate drive circuit set.

Embodiments of the present disclosure further provide a display device. The display device at least includes the special-shaped display panel provided in the embodiments of the present disclosure.

DETAILED DESCRIPTION OF THE EMBODIMENTS

In order to make the objectives, technical solutions, and advantages in the embodiments of the present disclosure clearer, the technical solutions in the embodiments of the present disclosure will be clearly and completely described below in combination with the accompanying drawings in the embodiments of the present disclosure. Apparently, the described embodiments are some rather than all of the embodiments of the present disclosure. Based on the described embodiments of the present disclosure, all other embodiments obtained by those of ordinary skill in the art without creative efforts fall within the scope of protection of the present disclosure.

Unless otherwise defined, technical or scientific terms used in the present disclosure should have ordinary meaning as understood by those of ordinary skill in the art to which the present disclosure belongs. "First", "second" and similar words used in the present disclosure do not mean any order, quantity or importance, but are only used for distinguishing different components. "Comprise", "include" and similar words are intended to mean that an element or item in front of the word encompasses elements or items that are listed behind the word and equivalents thereof, but do not exclude other elements or items. "Connect", "connected" and similar words are not limited to a physical or mechanical connection, but can include an electrical connection, whether direct or indirect. "Upper", "lower", "left", "right", etc. are merely used to indicate a relative position relation, which may also change accordingly when an absolute position of a described object changes.

In order to keep the following descriptions of embodiments of the present disclosure clear and concise, the present disclosure omits detailed descriptions of known functions and known components.

Figure 1:
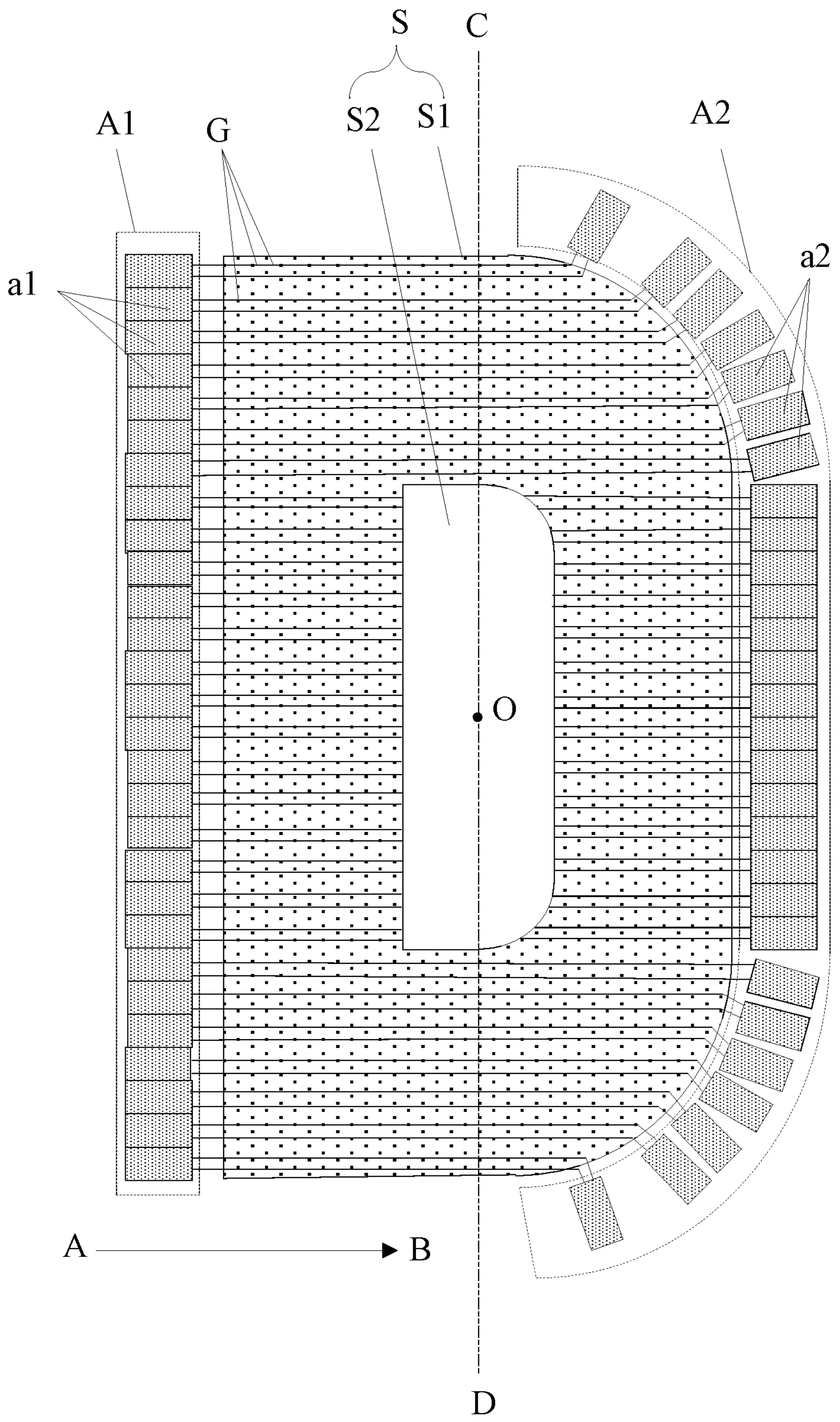
FIG. 1 is a schematic diagram of a special-shaped display panel according to an embodiment of the present disclosure.

With reference to FIG. 1, a special-shaped display panel is provided in embodiments of the present disclosure and includes:

a special-shaped display area S including a non-display sub-area S2 and a display sub-area S1 surrounding the non-display sub-area S2, the special-shaped display area S being provided with a plurality of gate lines G extending in a first direction AB, some of the gate lines G being cut off in the non-display sub-area S2, and the display sub-area S1 being asymmetric with respect to a straight line which passes through a center O of the special-shaped display area S and is perpendicular to the first direction AB; wherein the straight line which passes through the center O of the special-shaped display area and is perpendicular to the first direction AB may be taken as a first straight line CD, that is, the display sub-area S1 is asymmetric with respect to the first straight line CD, and as shown in FIG. 1, the display sub-area S1 is asymmetric left and right and may be symmetric up and down, and the non-display sub-area S2 may be a hollow area;

a first gate drive circuit set A1 located on one side (the left side as shown in FIG. 1) of the special-shaped display area S, electrically connected to one ends of the gate lines G which are not cut off by the non-display sub-area S2, and electrically connected to the gate lines G on one side which are cut off by the non-display sub-area S2, that is, in combination with FIG. 1, the first gate drive circuit set A1 being electrically connected to the gate lines G above the non-display sub-area S2, electrically connected to the gate lines G below the non-display sub-area S2, and further electrically connected to the gate lines G on a left side of the non-display sub-area S2; wherein, the first gate drive circuit set A1 may include a plurality of first gate drive circuits a1 cascaded in sequence, each of the first gate drive circuits a1 may generate an output signal (for example, the output signal may include a scanning signal provided for the gate lines G or a pull-down signal provided for a previous level first gate drive circuit a1) and further input the generated output signal to a next level or previous level first gate drive circuit a1, and each of the first gate drive circuits a1 may include a plurality of transistors and a capacitor; and a second gate drive circuit set A2 located on the other side (the right side as shown in FIG. 1) of the special-shaped display area S, electrically connected to the other ends of the gate lines which are not cut off by the non-display sub-area S2, and electrically connected to the gate lines on the other side which are cut off by the non-display sub-area S2, that is, in combination with FIG. 1, the second gate drive circuit set A2 being electrically connected to the gate lines G above the non-display sub-area S2, electrically connected to the gate lines G below the non-display sub-area S2, and further electrically connected to the gate lines G on a right side of the non-display sub-area S2; wherein the second gate drive circuit set A2 may include a plurality of second gate drive circuits a2, each of the second gate drive circuits a2 may generate an output signal and further input the generated output signal to a next level or previous level second gate drive circuit a2, each of the second gate drive circuits a2 may include a plurality of transistors and a capacitor, and the second gate driver circuits a2 may have the same configuration as the first gate drive circuits a1.

In the embodiments of the present disclosure, the display sub-area S1 is asymmetric with respect to the first straight line CD. For the special-shaped display area S on two sides of the first straight line CD, under the condition that the special-shaped display area is not cut off by the non-display sub-area S2 and the two sides are of a continuous integrated structure, double-side driving is used; under the condition that the special-shaped display area is cut off by the non-display sub-area S2, single-side driving is used for the two sides respectively, such that the display sub-areas S1 on the two sides cut off by the non-display sub-area S2 may receive synchronous driving signals (for example, scanning signals received by the cut gate lines G on the two sides are synchronous), the gate lines G do not need to bypass the non-display sub-area S2, the problem that a frame is large when the gate lines G bypass the non-display sub-area S2 to conduct single-side driving is avoided, and further, the problem that when the special-shaped display area S is integrally driven by a bilateral gate, pixels on the two sides cut off by the non-display sub-area S2 have difficulty in receiving synchronous signals, causing picture dislocation may be avoided.

During implementations, the special-shaped display panel in the embodiments of the present disclosure may be a letter-like screen, and the special-shaped display area S may be in a D shape as shown in FIG. 1, and alternatively, may be in other shapes including a D shape, for example, a B shape, a b shape, a d shape, a p shape, and a q shape. The special-shaped display area in a D shape is taken as an example for detailed description below. Other shapes all include a D-shaped pattern, and signal desynchrony is mainly caused by asymmetry on left and right sides of the D shape, such that the D-shaped pattern is mainly described in the embodiments of the present disclosure, and other display parts may be conventionally arranged due to a regular pattern.

Figure 2:
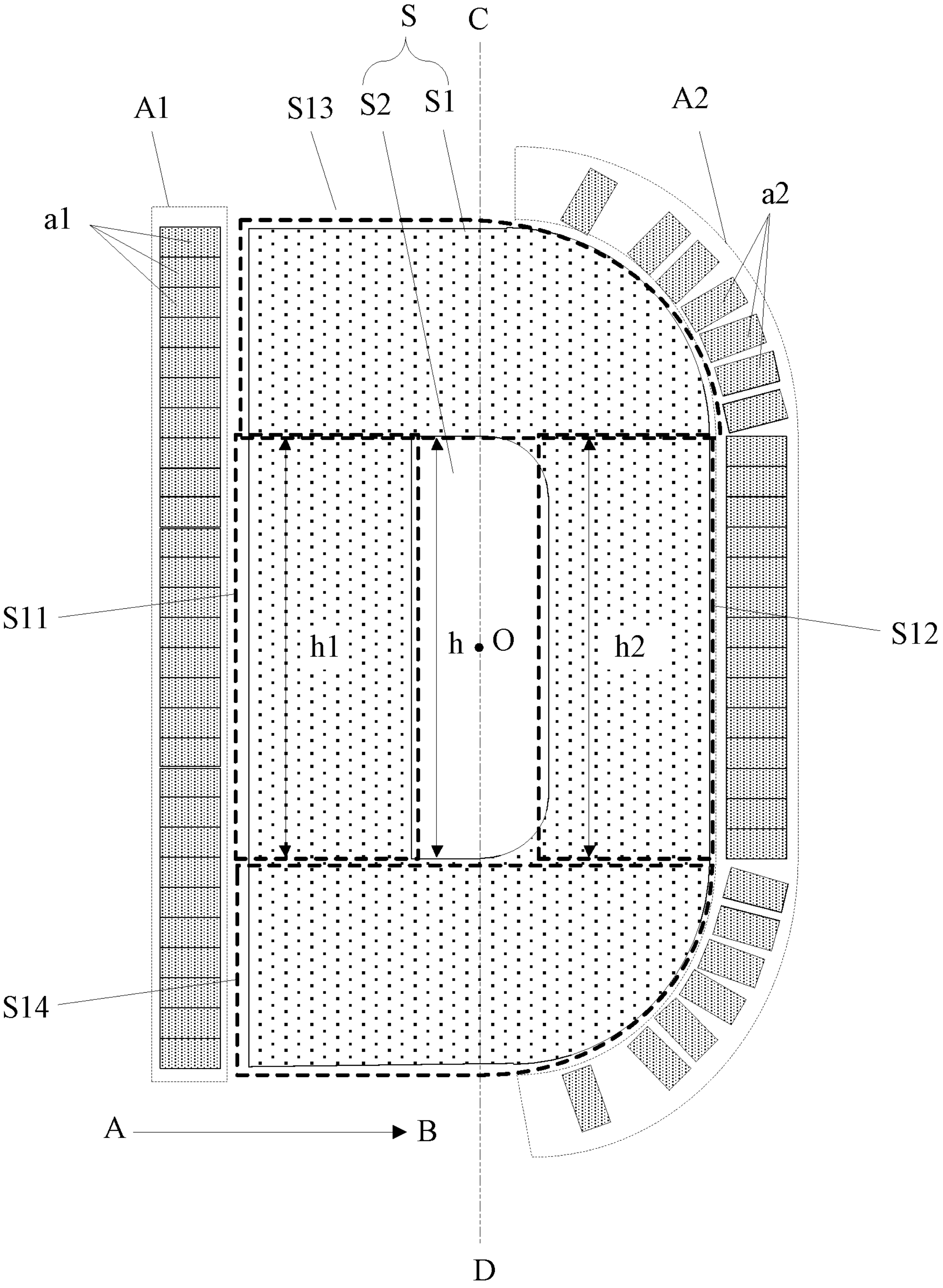
FIG. 2 is a schematic diagram of a special-shaped display panel including a plurality of display sub-areas according to an embodiment of the present disclosure.

During implementations, in combination with FIGS. 1 and 2, the display sub-area S1 includes: a first rectangular display sub-area S11 (a longer side of the rectangle may be perpendicular to the first direction AB) located on one side of the non-display sub-area S2, a second arc-shaped display sub-area S12 located on the other side of the non-display sub-area S2, a third display sub-region S13 connected to one end of the first display sub-area S11 (for example, an upper end of the first display sub-area S11) and one end of the second display sub-area S12 (for example, an upper end of the second display sub-area S12), and a fourth display sub-area S14 connected to the other end of the first display sub-area S11 (for example, a lower end of the first display sub-area S11) and the other end of the second display sub-area S12 (for example, a lower end of the second display sub-area S12). The gate line G in the first display sub-area S11 is electrically connected to the first gate drive circuit set A1 merely. The gate line in the second display sub-area S12 is electrically connected to the second gate drive circuit set A2 merely. One end of the gate line G in the third display sub-area S13 is electrically connected to the first gate drive circuit set A1, and the other end of the gate line in the third display sub-area is electrically connected to the second gate drive circuit set A2. One end of the gate line G in the fourth display sub-area S14 is electrically connected to the first gate drive circuit set A1, and the other end of the gate line in the fourth display sub-area is electrically connected to the second gate drive circuit set A2. In the embodiments of the present disclosure, the gate line(s) G in the first display sub-area S11 is/are electrically connected to the first gate drive circuit set A1 merely. The gate line(s) G in the second display sub-area S12 is/are electrically connected to the second gate drive circuit set A2 merely. One end of the gate line(s) G in the third display sub-area S13 is/are electrically connected to the first gate drive circuit set A1, and the other end of the gate line(s) in the third display sub-area is electrically connected to the second gate drive circuit set A2. One end of the gate line(s) G in the fourth display sub-area S14 is/are electrically connected to the first gate drive circuit set A1, and the other end of the gate line(s) in the fourth display sub-area is electrically connected to the second gate drive circuit set A2. Therefore, the first display sub-area S11 and the second display sub-area S12 that are cut off by the non-display sub-area S2 use single-side driving, and the third display sub-area S13 and the fourth display sub-area S14 that are not cut off by the non-display sub-area S2 use double-side driving.

It is to be noted that FIG. 2 does not show the gate lines G in order to clearly illustrate the first display sub-area S11, the second display sub-area S12, the third display sub-area S13, and the fourth display sub-area S14, but the present embodiments are not limited thereto, and the distribution of the gate lines G may be seen in FIG. 1.

During implementations, in combination with FIG. 2, a length h1 of the first display sub-area S11 perpendicular to the first direction AB is equal to a maximum length h of the non-display sub-area S2 perpendicular to the first direction AB. The length h1 of the first display sub-area S11 perpendicular to the first direction AB is equal to a maximum length h2 of the second display sub-area S12 perpendicular to the first direction AB. In the embodiments of the present disclosure, the length h1 of the first display sub-area S11 perpendicular to the first direction AB is equal to the maximum length h of the non-display sub-area S2 perpendicular to the first direction AB. The length h1 of the first display sub-area S11 perpendicular to the first direction AB is equal to the maximum length h2 of the second display sub-area S12 perpendicular to the first direction AB. Therefore, the pixels of the first display sub-area S11 and the second display sub-area S12 may be symmetrically distributed, and then the first gate drive circuit(s) a1 of the first display sub-area S11 and the second gate drive circuit(s) a2 of the second display sub-area S12 may be symmetrically distributed, so that output signals of the first gate drive circuit) a1 and the second gate drive circuit a2 can be synchronously output to the adjacent first gate drive circuit a1 and second gate drive circuit a2, and further the problem that pictures on the two sides of the non-display sub-area S2 are not synchronous can be solved.

During implementations, in combination with FIGS. 1 and 2, the gate line G in the first display sub-area S11 has the same length as the gate line G in the second display sub-area S12 in the first direction AB. In the embodiments of the present disclosure, the length of the gate line Gin the first display sub-area S11 in the first direction AB is same as the length of the gate line G in the second display sub-area S12 in the first direction AB. Therefore, when the gate lines G on the two sides of the non-display sub-area S2 generate signal delay due to own line resistance, the signal delay amounts generated on the two sides are equal, and finally, the signals received by the pixels at the symmetrical positions on the two sides are consistent, so as to solve the problem of picture dislocation caused by inconsistent signal delay amounts due to the line resistance of the gate lines G.

During implementations, the first display sub-area S11 is provided with a plurality of first pixels (not shown in the figure) distributed in an array, and the second display sub-area S12 is provided with a plurality of second pixels (not shown in the figure) distributed in an array. The first pixels in the first display sub-area S11 arranged in sequence in the first direction AB has the same column count as the second pixels in the second display sub-area S12 arranged in sequence in the first direction AB. A column direction of the first pixels is perpendicular to the first direction AB, and a column direction of the second pixels is perpendicular to the first direction AB. In the embodiments of the present disclosure, the column count of the pixels is related to a data line and a pixel drive circuit for driving the pixels, such that the first pixels in the first display sub-area S11 have the same column count as the second pixels in the second display sub-area S12, and then a resistance-capacitance loading (RC Loading) generated when the gate line G in the first display sub-area S11 overlaps the data line and a signal line in the pixel drive circuit may be equal to a RC Loading generated when the corresponding gate line G in the second display sub-area S12 overlaps the data line and the signal line in the pixel drive circuit, so as to solve the problem of picture dislocation caused by the signal delay of the RC Loading generated when the gate line G overlaps the data line and the signal line in the pixel circuit.

During implementations, in combination with FIGS. 1 and 2, an outer contour of one side, away from the non-display sub-area S2, of the third display sub-area S13 is arc-shaped, and an outer contour of one side, away from the non-display sub-area S2, of the fourth display sub-area S14 is arc-shaped. The first gate drive circuit set A1 is arranged around the third display sub-area S13 at a periphery of the third display sub-area S13; and the second gate drive circuit set A2 is arranged around the fourth display sub-area S14 at a periphery of the fourth display sub-area S14. In the embodiments of the present disclosure, the first gate drive circuit set A1 is arranged around the third display sub-area S13 at a periphery of the third display sub-area S13; and the second gate drive circuit set A2 is arranged around the fourth display sub-area S14 at a periphery of the fourth display sub-area S14. Therefore, the second gate drive circuit set A2 is arranged close to the third display sub-area S13 and the fourth display sub-area S14, and the signal delay of the gate line G caused by line resistance and generated at a position where no pixel driving is needed is avoided.

Figure 3:
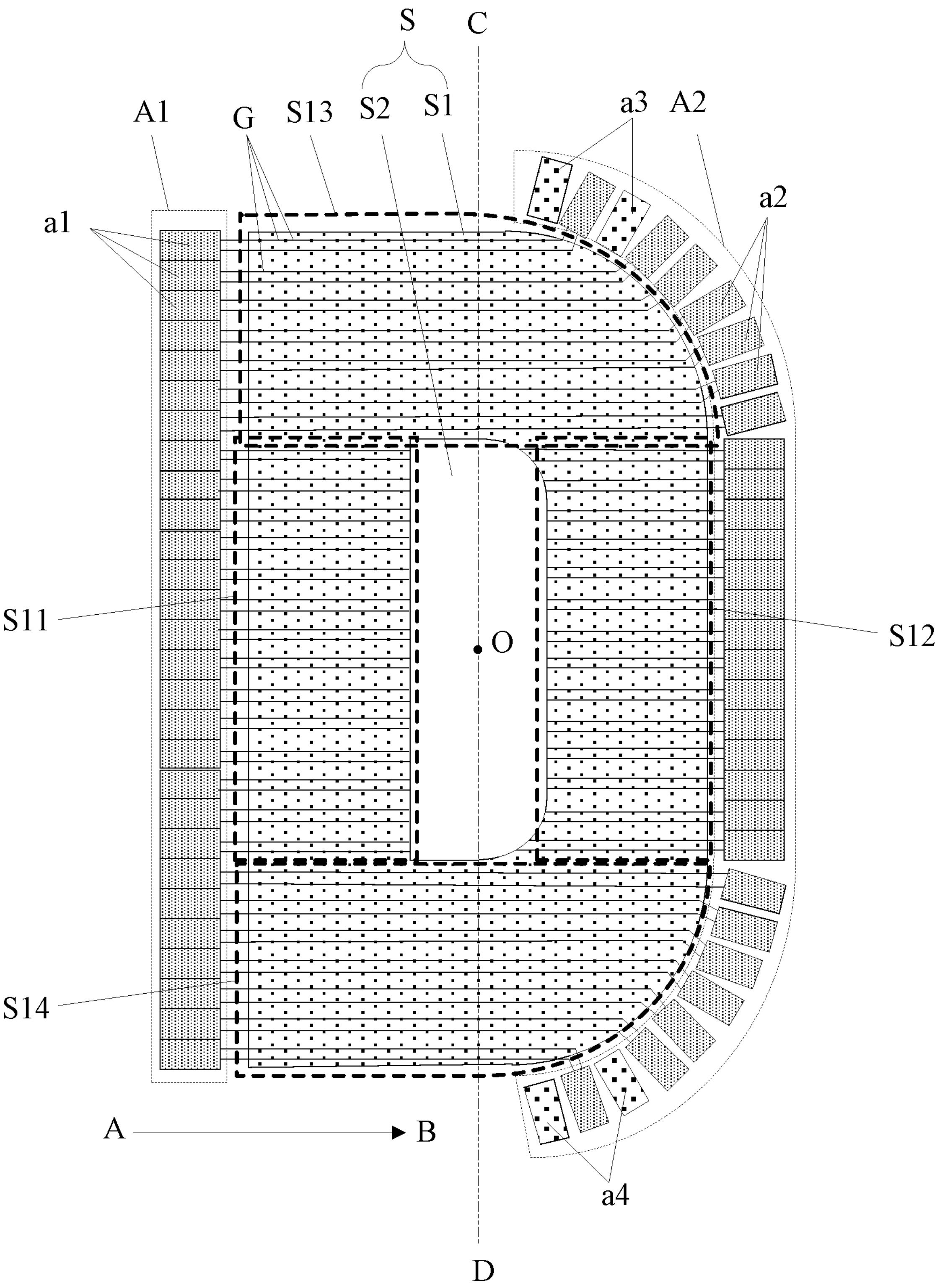
FIG. 3 is a schematic diagram of a special-shaped display panel including a first-type floating gate drive circuit and a second-type floating gate drive circuit according to an embodiment of the present disclosure.
Figure 4:
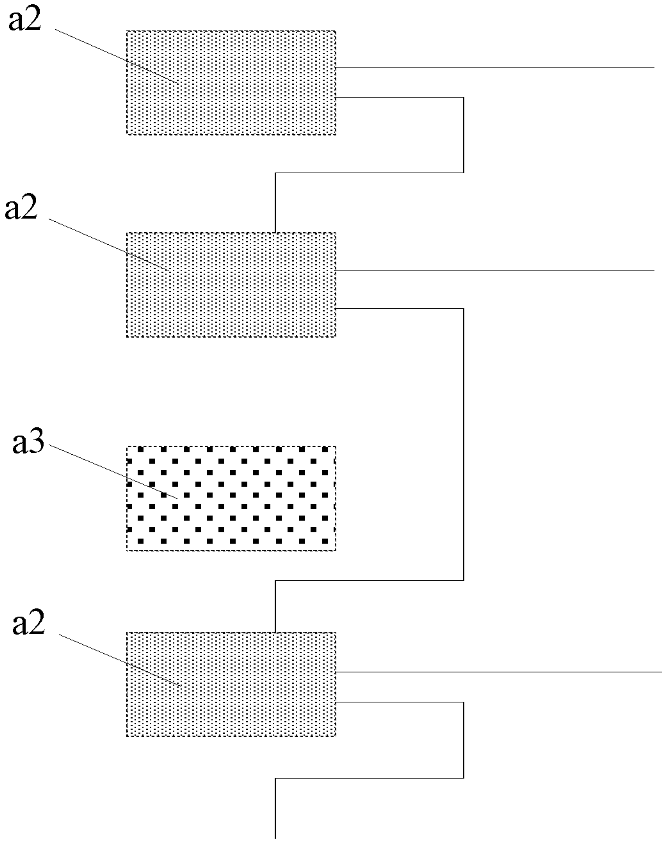
FIG. 4 is a schematic connection diagram of a first gate drive circuit and a first-type floating gate drive circuit according to an embodiment of the present disclosure.

During implementations, with reference to FIGS. 3 and 4, a first-type floating gate drive circuit a3 is arranged between two second gate drive circuits a2 in at least part of pairs of adjacent second gate drive circuits a2 at the periphery of the third display sub-area S13. A second-type floating gate drive circuit a4 is arranged between two second gate drive circuits a2 in at least part of pairs of adjacent second gate drive circuits a2 at the periphery of the fourth display sub-area S14. The two adjacent second gate drive circuits a2 at the periphery of the third display sub-area S13 are electrically connected to each other by means of a signal line skipping the first-type floating gate drive circuit a3; and the two adjacent second gate drive circuits a2 at the periphery of the fourth display sub-area S14 are electrically connected to each other by means of a signal line skipping the second-type floating gate drive circuit a4. In the embodiments of the present disclosure, the first-type floating gate drive circuit a3 is arranged between two second gate drive circuits a2 in at least part of pairs of adjacent second gate drive circuits a2 at the periphery of the third display sub-area S13; and the second-type floating gate drive circuit a4 is arranged between two second gate drive circuits a2 in at least part of pairs of adjacent second gate drive circuits a2 at the periphery of the fourth display sub-area S14. Therefore, patterns of the second gate drive circuit set A2 on outer sides of the third display sub-area S13 and the fourth display sub-area S14 are uniform during manufacturing, and so as to avoid the problem that a final line width at a position requiring a uniform line width is not uniform due to non-uniform pattern distribution during exposure and etching (for example, gate pattern sizes of corresponding transistors with an identical function in two adjacent second gate drive circuits a2 are inconsistent). That is, in the embodiments of the present disclosure, the first-type floating gate drive circuit a3 and the second-type floating gate drive circuit a4 are mainly arranged to avoid influence on other patterns during composition and do not transmit a signal in the cascaded first gate drive circuits a1 or the cascaded second gate drive circuits a2. When passing through the first-type floating gate drive circuit a3, the first gate drive circuit a1 is not connected to a signal line and is electrically connected to the next first gate drive circuit a1 directly. Similarly, when passing through the second-type floating gate drive circuit a4, the second gate drive circuit a2 is not connected to a signal line and is electrically connected to the next second gate drive circuit a2 directly.

Figure 5:
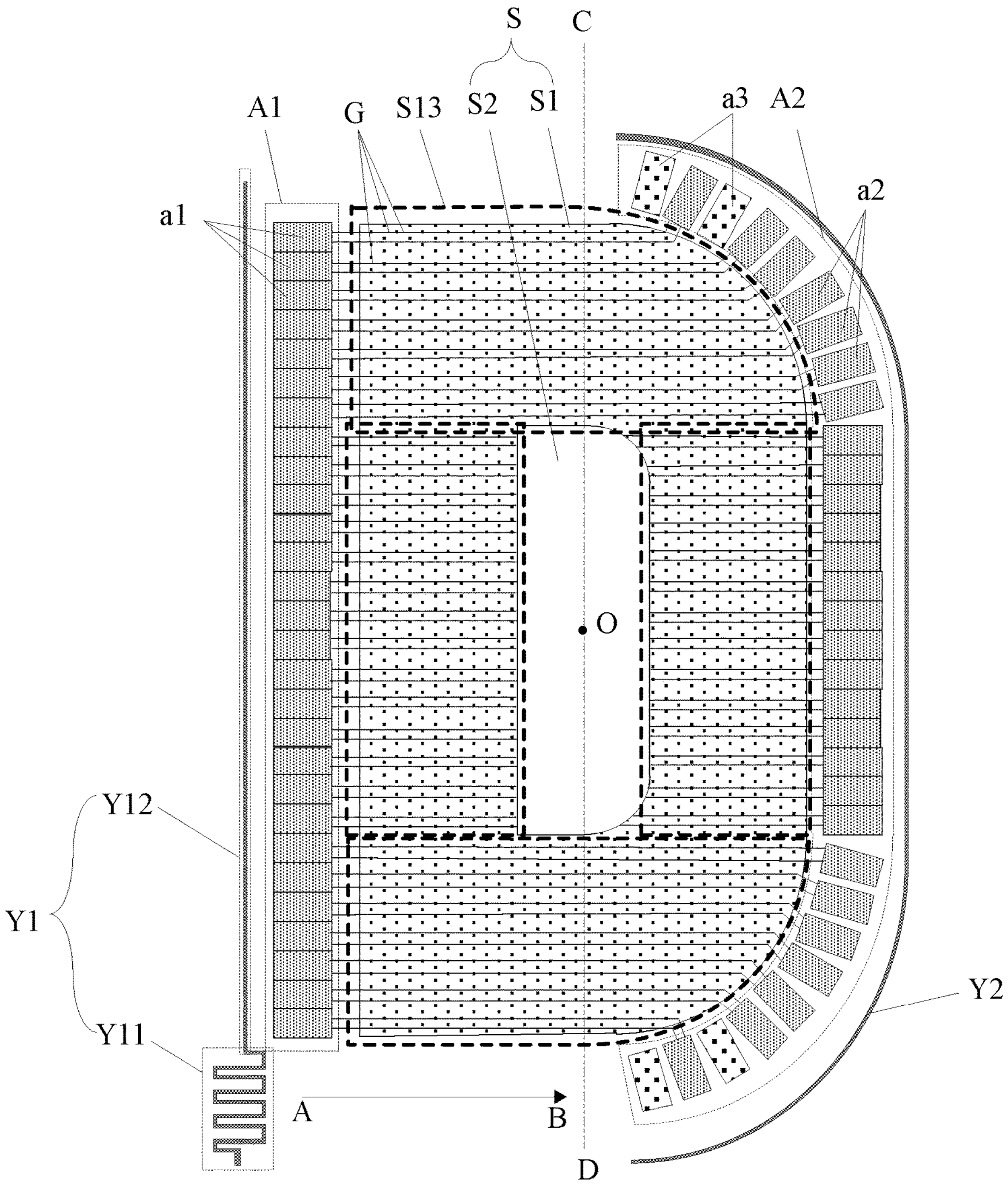
FIG. 5 is a schematic diagram of a special-shaped display panel including a first pulse signal line and a second pulse signal line according to an embodiment of the present disclosure.

During implementations, with reference to FIG. 5, the special-shaped display panel further includes: a first pulse signal line Y1 located at a periphery of the first display sub-area S11 and having a body extension direction perpendicular to the first direction AB, and an arc-shaped second pulse signal line Y2 located at a periphery of the second display sub-area S12 and surrounding an arc-shaped outer contour. The first pulse signal line Y1 includes a serpentine wire portion Y11 and a linear wire portion Y12 electrically connected to the serpentine wire portion Y11. A total length of the serpentine wire portion Y11 and the linear wire portion Y12 is equal to a length of the second pulse signal line Y2. For example, the first pulse signal line Y1 may be a start-of-frame signal line STV or a clock signal line CLK for providing a signal for the first gate drive circuit set A1. The second pulse signal line Y2 may be a start-of-frame signal line STV or a clock signal line CLK for providing a signal for the second gate drive circuit set A2. In the embodiments of the present disclosure, the first pulse signal line Y1 is provided with a serpentine wire portion Y11, so as to compensate the length of the first pulse signal line Y1. The first pulse signal line Y1 has a same total length as the second pulse signal line Y2. The situation that an initial pulse signal provided for the first gate drive circuit set A1 and an initial pulse signal provided for the second gate drive circuit set A2 are different due to different line resistances when the lengths of the first pulse signal line and the second pulse signal line are different, and then signals subsequently provided for the first display sub-area S11 and the second display sub-area S12 are different, causing image dislocation is avoided.

Figure 6:
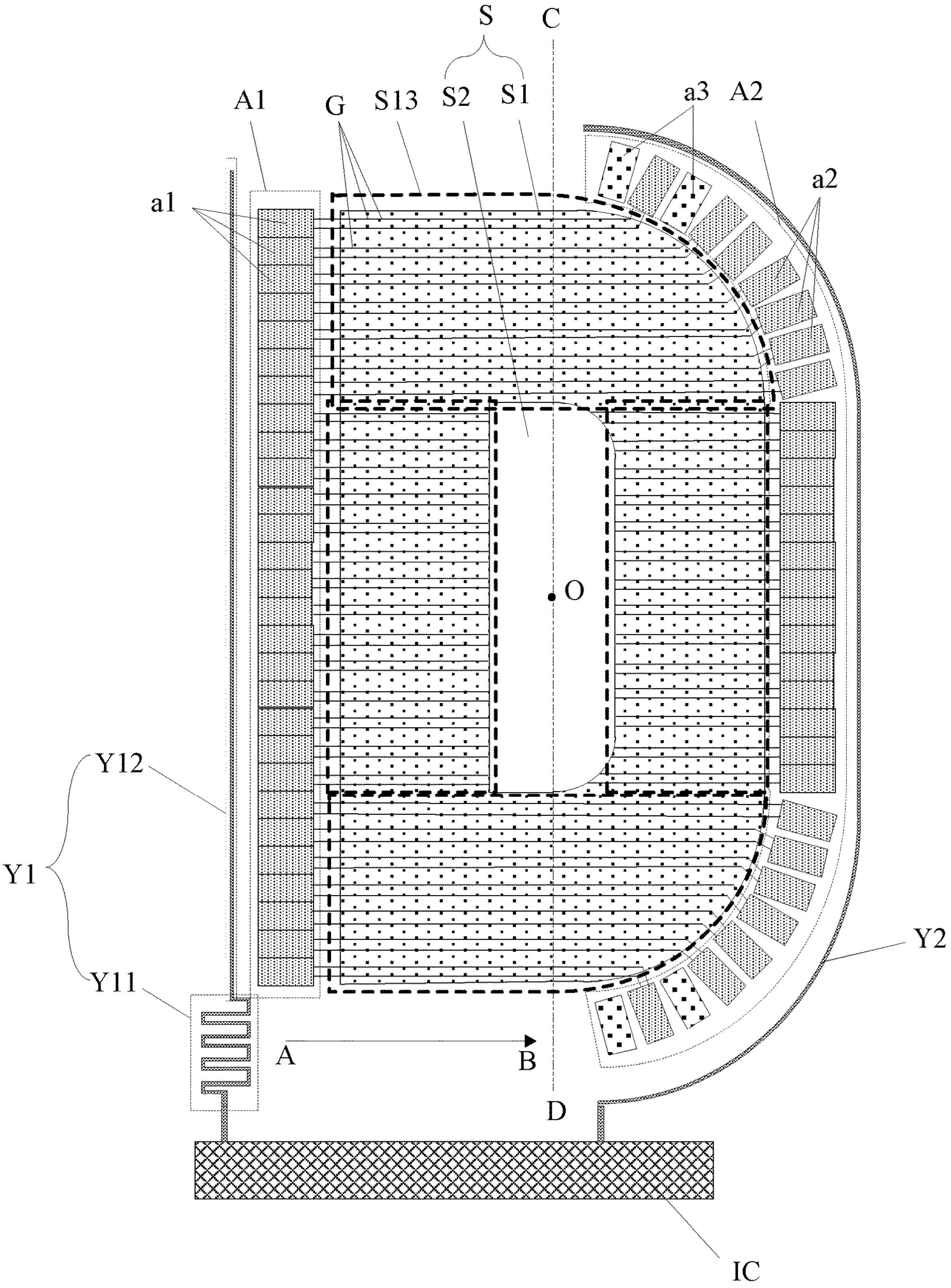
FIG. 6 is a schematic diagram of a special-shaped display panel including a first pulse signal line, a second pulse signal line and a control IC according to an embodiment of the present disclosure.

During implementations, with reference to FIG. 6, the special-shaped display panel further includes a control integrated circuit (IC). The linear wire portion Y12 is electrically connected to the control IC by means of the serpentine wire portion Y11. That is, the first pulse signal line Y1 may be provided with only one serpentine wire portion Y11, and the serpentine wire portion Y11 is arranged at an end connected to the control IC, so as to reduce the signal delay as much as possible before the signal is transmitted to each first gate drive circuit or each second gate drive circuit, and avoid the problem that the initial signals received by the initial first gate drive circuit and the initial second gate drive circuit are greatly different since the signal delay amounts reaching the initial first gate drive circuit and the initial second gate drive circuit are large when the line resistance errors are gradually accumulated in the subsequent process.

Figure 7:
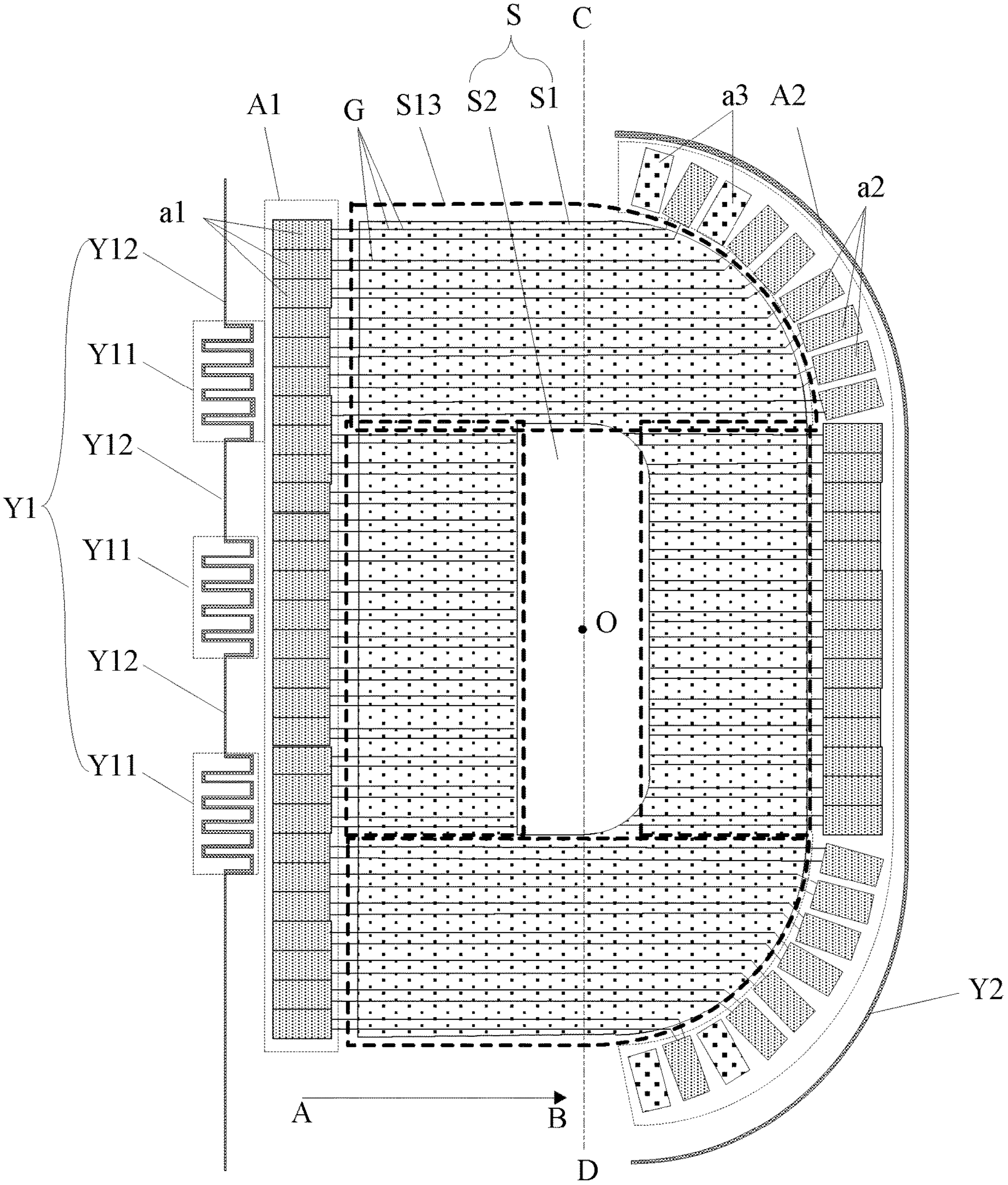
FIG. 7 is a schematic diagram of a special-shaped display panel including a plurality of serpentine wire portions according to an embodiment of the present disclosure.

During implementations, with reference to FIG. 7, the first pulse signal line Y1 includes a plurality of serpentine wire portions Y11. The plurality of serpentine wire portions Y11 is distributed on the first pulse signal line Y1 in sequence at equal intervals. In the embodiments of the present disclosure, the first pulse signal line Y1 may be provided with a plurality of serpentine wire portions Y11, and the plurality of serpentine wire portions Y11 are distributed on the first pulse signal line Y1 at equal intervals. Therefore, the problem of different signal delay amounts caused by different line resistances may be reduced.

During implementations, in combination with FIGS. 5-7, the first pulse signal line Y1 has the same line width as the second pulse signal line Y2. In the embodiments of the present disclosure, the first pulse signal line Y1 has the same line width as the second pulse signal line Y2. Therefore, the problem of different signal delay amounts caused by different line widths and different line resistances of the first pulse signal line Y1 and the second pulse signal line Y2 may be solved.

Figure 8:
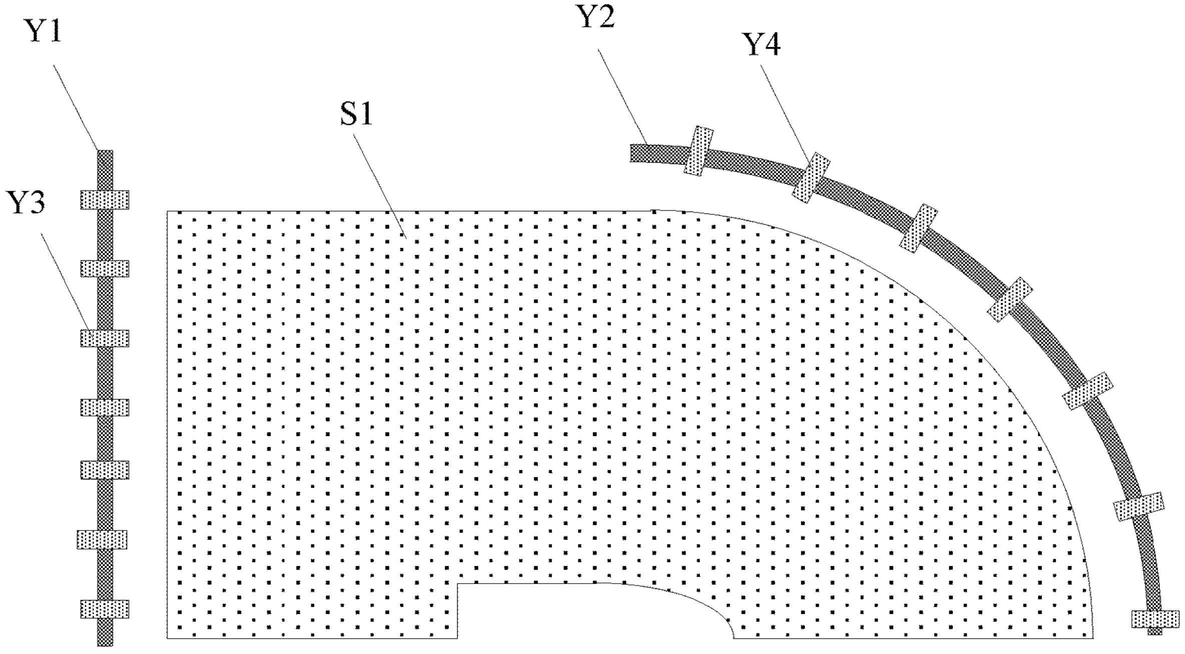
FIG. 8 is a schematic overlapping diagram of a first pulse signal line and a first-type signal wire according to an embodiment of the present disclosure.

During implementations, with reference to FIG. 8, the display panel further includes a plurality of first-type signal wires Y3 intersecting with the first pulse signal line Y1 in an insulated mode, and a plurality of second-type signal wires Y4 intersecting with the second pulse signal line Y2 in an insulated mode. An overlapping area of the first pulse signal line Y1 and the first-type signal wires Y3 is equal to that of the second pulse signal line Y2 and the second-type signal wires Y4. During implementations, the first-type signal wires Y3 may be signal wires in the first gate drive circuit set A1. The second-type signal wires Y4 may be signal wires in the second gate drive circuit set A2. In the embodiments of the present disclosure, the overlapping area of the first pulse signal line Y1 and the first-type signal wires Y3 is equal to that of the second pulse signal line Y2 and the second-type signal wires Y4. Therefore, an influence of parasitic capacitance generated when the first pulse signal line Y1 and the first-type of signal wires Y3 overlap on the signal delay may be reduced, and an influence of stray capacitance generated when the second pulse signal line Y2 and the second-type signal wires Y4 overlap on the signal delay may be reduced.

During implementations, as shown in FIG. 8, the first pulse signal line Y1 perpendicularly intersects with the first-type signal wires Y3. The second pulse signal line Y2 perpendicularly intersects with the second-type signal wires Y4.

It is to be noted that in order to clearly show an overlapping mode of the first pulse signal line and the first-type signal wires and an overlapping mode of the second pulse signal line and the second-type signal wires, FIG. 8 is merely a schematic overlapping diagram illustrating a first pulse signal line and first-type signal wires, and a second pulse signal line and second-type signal wires at the periphery of a part of the third display sub-area above the non-display sub-area, and the overlapping mode of first pulse signal lines and first-type signal wires, and second pulse signal lines and second-type signal wires at other positions may be similar to that.

A display device is further provided in embodiments of the present disclosure. The display device includes the special-shaped display panel provided in the embodiments of the present disclosure.

The embodiments of the present disclosure have the following beneficial effects. In the embodiments of the present disclosure, the display sub-area is asymmetric with respect to a straight line which passes through a center of the special-shaped display area and is perpendicular to a first direction. The straight line which passes through the center of the special-shaped display area and is perpendicular to the first direction is taken as a first straight line. For the special-shaped display area on two sides of the first straight line, under the condition that the special-shaped display area is not cut off by the non-display sub-area and the two sides are of a continuous integrated structure, double-side driving is used; under the condition that the special-shaped display area is cut off by the non-display sub-area, single-side driving is used for the two sides respectively, such that the display sub-areas on the two sides cut off by the non-display sub-area may receive synchronous driving signals (for example, scanning signals received by the cut gate lines on the two sides are synchronous). The gate lines do not need to bypass the non-display sub-area, the problem that a frame is large when the gate lines bypass the non-display sub-area to conduct single-side driving is avoided. Further, the problem that when the special-shaped display area is integrally driven by a bilateral gate, pixels on the two sides cut off by the non-display sub-area have difficulty in receiving synchronous signals, causing picture dislocation may be avoided.

Apparently, those skilled in the art can make various amendments and variations to the present disclosure without departing from the spirit and scope of the present disclosure. In this way, if the amendments and variations to the present disclosure fall within the scope of claims of the present disclosure and the equivalents thereof, it is intended that the present disclosure also includes these amendments and variations.

What is claimed is:

1. A special-shaped display panel, comprising:
a special-shaped display area comprising:
a non-display sub-area, and
a display sub-area surrounding the non-display sub-area;
wherein the special-shaped display area is provided with a plurality of gate lines extending in a first direction, some of the gate lines are cut off in the non-display sub-area, and the display sub-area is asymmetric with respect to a straight line which passes through a center of the special-shaped display area and is perpendicular to the first direction;
a first gate drive circuit set located on one side of the special-shaped display area, electrically connected to one ends of gate lines which are not cut off by the non-display sub-area, and electrically connected to gate lines on one side which are cut off by the non-display sub-area; and
a second gate drive circuit set located on another side of the special-shaped display area, electrically connected to other ends of the gate lines which are not cut off by the non-display sub-area, and electrically connected to the gate lines on another side which are cut off by the non-display sub-area;
wherein the display sub-area comprises:
a first display sub-area which is rectangular and located on one side of the non-display sub-area,
a second display sub-area which is arc-shaped and located on another side of the non-display sub-area,
a third display sub-area connected to one end of the first display sub-area and one end of the second display sub-area, and
a fourth display sub-area connected to another end of the first display sub-area and another end of the second display sub-area; and
the special-shaped display panel further comprises:
a first pulse signal line located at a periphery of the first display sub-area and having a body extension direction perpendicular to the first direction, and
a second pulse signal line which is arc-shaped, located at a periphery of the second display sub-area, and surrounding an arc-shaped outer contour of the display sub-area,
wherein the first pulse signal line comprises:
a serpentine wire portion, and
a linear wire portion electrically connected to the serpentine wire portion,
wherein a total length of the serpentine wire portion and the linear wire portion is equal to a length of the second pulse signal line; and
wherein the second pulse signal line only comprises an arc-shaped wire portion surrounding the arc-shaped outer contour of the display sub-area.

2. The special-shaped display panel according to claim 1, wherein a gate line in the first display sub-area is only electrically connected to the first gate drive circuit set;
a gate line in the second display sub-area is only electrically connected to the second gate drive circuit set;
one end of a gate line in the third display sub-area is electrically connected to the first gate drive circuit set, and another end of the gate line in the third display sub-area is electrically connected to the second gate drive circuit set; and
one end of a gate line in the fourth display sub-area is electrically connected to the first gate drive circuit set, and another end of the gate line in the fourth display sub-area is electrically connected to the second gate drive circuit set.

3. The special-shaped display panel according to claim 2, wherein:
a length of the first display sub-area perpendicular to the first direction is equal to a maximum length of the non-display sub-area perpendicular to the first direction; and
the length of the first display sub-area perpendicular to the first direction is equal to a maximum length of the second display sub-area perpendicular to the first direction.

4. The special-shaped display panel according to claim 2, wherein a length of the gate line in the first display sub-area in the first direction is equal to a length of the gate line in the second display sub-area in the first direction.

5. The special-shaped display panel according to claim 4, wherein the first display sub-area is provided with a plurality of first pixels distributed in an array, and the second display sub-area is provided with a plurality of second pixels distributed in an array; and
a column count of the first pixels arranged in sequence in the first direction in the first display sub-area is equal to a column count of the second pixels arranged in sequence in the first direction in the second display sub-area.

6. The special-shaped display panel according to claim 2, wherein an outer contour of one side, away from the non-display sub-area, of the third display sub-area is arc-shaped, and an outer contour of one side, away from the non-display sub-area, of the fourth display sub-area is arc-shaped;
the second gate drive circuit set is arranged around the third display sub-area at a periphery of the third display sub-area; and the second gate drive circuit set is arranged around the fourth display sub-area at a periphery of the fourth display sub-area.

7. The special-shaped display panel according to claim 6, wherein the first gate drive circuit set comprises a plurality of first gate drive circuits which are cascaded mutually; the second gate drive circuit set comprises a plurality of second gate drive circuits which are cascaded mutually;
a first-type floating gate drive circuit is arranged between two adjacent second gate drive circuits in at least part of adjacent second gate drive circuits at the periphery of the third display sub-area; a second-type floating gate drive circuit is arranged between two adjacent second gate drive circuits in at least part of adjacent second gate drive circuits at the periphery of the fourth display sub-area;
the two adjacent second gate drive circuits at the periphery of the third display sub-area are electrically connected to each other through a signal line skipping the first-type floating gate drive circuit; and the two adjacent second gate drive circuits at the periphery of the fourth display sub-area are electrically connected to each other through a signal line skipping the second-type floating gate drive circuit.

8. The special-shaped display panel according to claim 1, further comprising:
a control integrated circuit (IC),
wherein the linear wire portion is electrically connected to the control IC through the serpentine wire portion.

9. The special-shaped display panel according to claim 1, wherein the first pulse signal line comprises a plurality of serpentine wire portions, the plurality of serpentine wire portions being distributed on the first pulse signal line in sequence at equal intervals.

10. The special-shaped display panel according to claim 1, wherein the first pulse signal line and the second pulse signal line are start-of-frame signal lines; or the first pulse signal line and the second pulse signal line are clock signal lines.

11. The special-shaped display panel according to claim 1, wherein the first pulse signal line has a same line width as the second pulse signal line.

12. The special-shaped display panel according to claim 1, further comprising:

a plurality of first-type signal wires intersecting with the first pulse signal line in an insulated mode, and a plurality of second-type signal wires intersecting with the second pulse signal line in an insulated mode, wherein an overlapping area of the first pulse signal line and the first-type signal wires is equal to an overlapping area of the second pulse signal line and the second-type signal wires.

13. The special-shaped display panel according to claim 12, wherein the first pulse signal line perpendicularly intersects with the first-type signal wires; and the second pulse signal line perpendicularly intersects with the second-type signal wires.

14. The special-shaped display panel according to claim 12, wherein the first-type signal wires are signal wires in the first gate drive circuit set; and the second-type signal wires are signal wires in the second gate drive circuit set.

15. A display device, at least comprising the special-shaped display panel according to claim 1.

* * * * *